United States Patent [19]
Bush et al.

[11] Patent Number: 5,893,923
[45] Date of Patent: Apr. 13, 1999

[54] MICROCONTROLLER UTILIZING A CIRCUIT TO SELECT DURING RESET PROCESS AN INTERNAL OR EXTERNAL MEMORY AS BASE MEMORY

[75] Inventors: Craig Palmer Bush; David Brian Langer, both of Lexington, Ky.

[73] Assignee: Lexmark International, Inc., Lexington, Ky.

[21] Appl. No.: 08/854,611

[22] Filed: May 12, 1997

[51] Int. Cl.$^6$ ............................................. G06F 13/00
[52] U.S. Cl. ................................. 711/154; 395/651
[58] Field of Search ............................. 711/166, 100, 711/115, 154; 395/651, 652

[56] References Cited

U.S. PATENT DOCUMENTS

| | | | |
|---|---|---|---|
| 4,287,560 | 9/1981 | Forbes et al. | 364/200 |
| 4,374,418 | 2/1983 | Catiller et al. | 364/200 |
| 4,649,511 | 3/1987 | Gdula | 364/900 |
| 5,067,077 | 11/1991 | Wakimoto et al. | 395/400 |
| 5,222,226 | 6/1993 | Yamaguchi et al. | 395/425 |
| 5,283,792 | 2/1994 | Davies, Jr. et al. | 371/66 |
| 5,291,425 | 3/1994 | Nagaishi | 364/570 |
| 5,361,365 | 11/1994 | Hirano et al. | 395/651 |
| 5,371,869 | 12/1994 | Lee | 395/425 |
| 5,404,560 | 4/1995 | Lee et al. | 395/800 |
| 5,410,707 | 4/1995 | Bell | 395/652 |
| 5,426,769 | 6/1995 | Pawloski | 395/500 |
| 5,535,417 | 7/1996 | Baji et al. | 395/842 |
| 5,566,320 | 10/1996 | Hubert | 395/474 |
| 5,737,760 | 4/1998 | Grimmer, Jr. et al. | 711/163 |
| 5,737,765 | 4/1998 | Shigeeda | 711/170 |
| 5,809,544 | 9/1998 | Dorsey et al. | 711/163 |

Primary Examiner—Tod R. Swann
Assistant Examiner—Felix B. Lee
Attorney, Agent, or Firm—Andrew S. Neely; Ronald K. Aust

[57] ABSTRACT

A circuit for selecting a base memory to be accessed by a microcontroller in response to a command from the microcontroller. An input receives the command from the microcontroller. The command selectively instructs the circuit to reset the microcontroller and signal the microcontroller to access an internal memory as the base memory. Also, the command selectively instructs the circuit to reset the microcontroller and signal the microcontroller to access an external memory as the base memory. A reset output is used to send the reset signal to the microcontroller, and a memory select output is used to send a memory select signal to the microcontroller. A logic circuit processes the command received from the microcontroller, and selectively sends an internal base memory select signal on the memory select output in response to the command received from the microcontroller, while the reset signal is being processed by the microcontroller, and selectively sends an external base memory select signal on the memory select output in response to the command received from the microcontroller while the reset signal is being processed by the microcontroller.

21 Claims, 1 Drawing Sheet

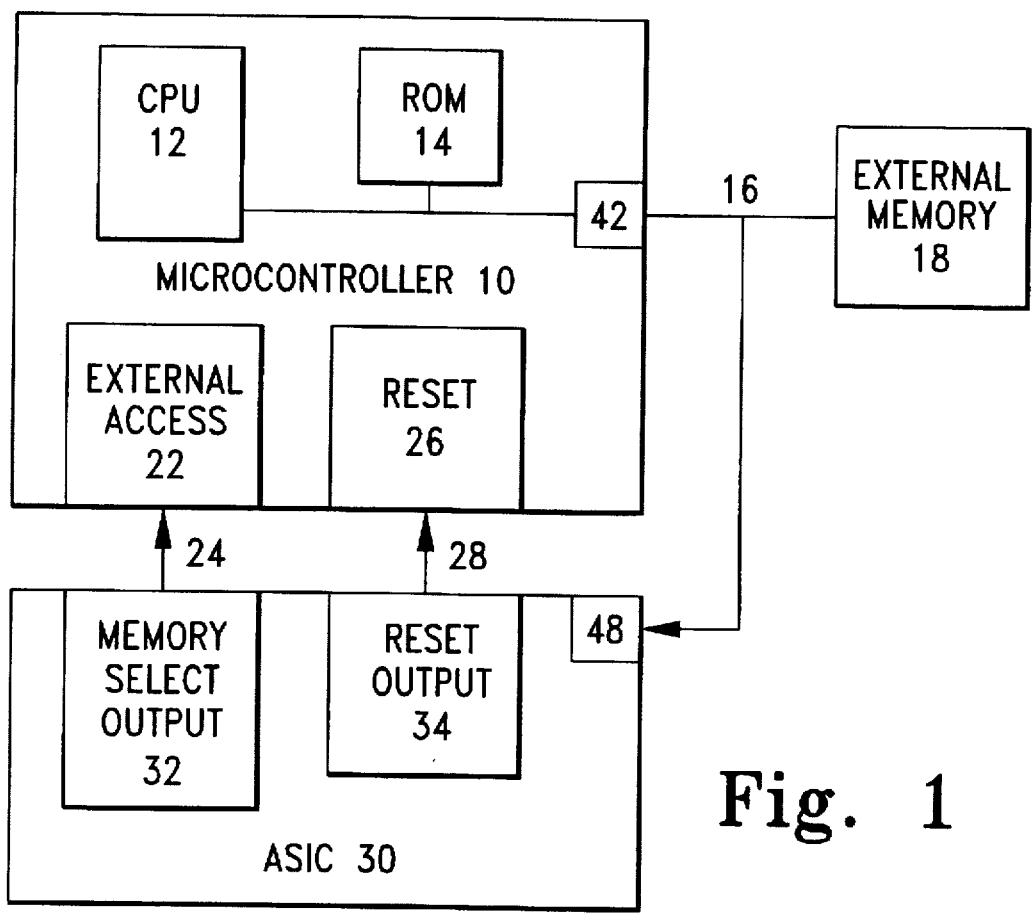
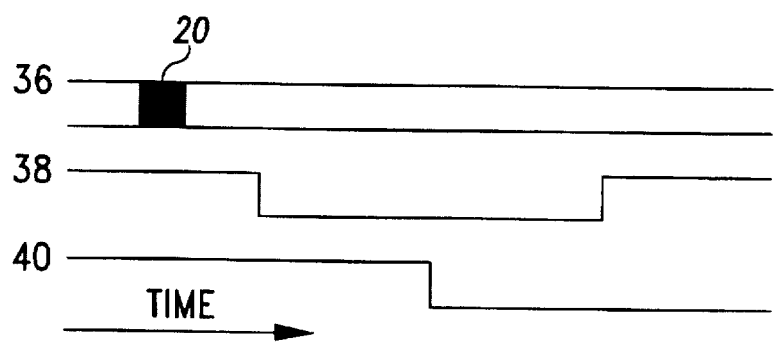
Fig. 2
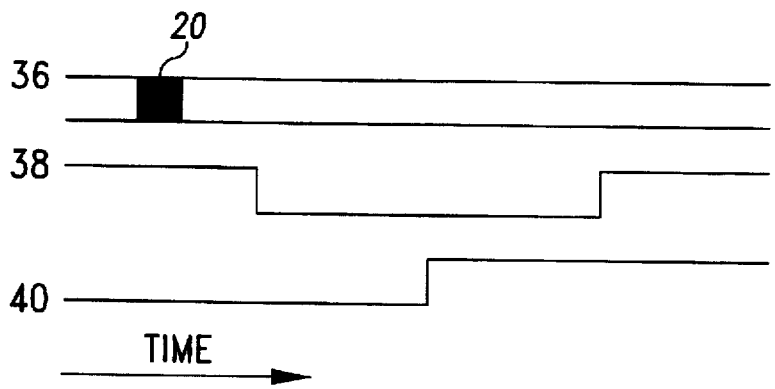
Fig. 3

5,893,923

MICROCONTROLLER UTILIZING A CIRCUIT TO SELECT DURING RESET PROCESS AN INTERNAL OR EXTERNAL MEMORY AS BASE MEMORY

FIELD OF THE INVENTION

This invention relates to the field of microcontrollers. More particularly the invention relates to increasing the amount of usable memory available to microcontrollers.

BACKGROUND OF THE INVENTION

Microcontrollers provide a good balance between cost and performance for those applications which do not require extensive computing power, and which cannot bear expensive components. A microcontroller is typically a monolithic device, including a central processing unit (CPU), a read only memory (ROM), and a random access memory (RAM). The ROM contains instruction code for the CPU, and the RAM can hold current variable information required by the CPU as it completes the instructions read from the ROM.

Often, a microcontroller is able to access the internal ROM provided as a part of the microcontroller, and an external ROM. Typically, the external ROM can be of a larger capacity than the internal ROM. For example, the internal ROM may have a capacity of 32K bytes, and yet the microcontroller may be able to access an external ROM having a capacity of 64K bytes.

The microcontroller usually accesses either the internal or external ROM as the base memory, according to the level of the input on one of the microcontroller input pins. This input pin is typically referred to as the external access pin, or EA pin. For example, if the level of the signal on the EA is low, then the microcontroller may understand to access the external memory as the base memory, and if the level on the EA is high, then the microcontroller may understand to access the internal memory as the base memory.

If the internal memory is designated as the base memory, then all values at an address within the range of the internal memory are accessed by fetches from the internal memory. However, when an address above the range of the internal memory is requested, the value is accessed by a fetch from the external memory. Thus, with the internal memory designated as the base memory, all memory addresses of the internal memory are accessible, and the memory addresses of the external memory above the highest address of the internal memory are also accessible. Therefore, in this mode, the lower addresses of the external memory, which correspond to the addresses of the internal memory, are not accessible. If the external memory is designated as the base memory, then all values at an address within the range of the external memory are accessed by fetches from the external memory. In this mode the addresses of the internal memory are not accessible at all.

While it may appear to be a simple matter to access all of the memory available in the internal memory and external memory, placing this access within the control of the microcontroller is a difficult matter. One possible method for doing this is to connect an output of the microcontroller to the EA. Thus, the microcontroller could alter the level of the signal on the EA at any time that it desired to access the other memory as the base memory. Unfortunately, operating the microcontroller in this mode typically produces an unstable operation. Therefore, most microcontroller manufacturers recommend that the level on the EA remain stable after a reset, and will not guarantee the operation of the microcontroller under other circumstances.

The effect of this restriction is that an amount of memory space equal to the capacity of the internal memory is wasted when the external memory is the base memory, as the internal memory cannot be accessed in this mode. Alternatively, an amount of memory space equal to the capacity of the external memory below the highest address of the internal memory is wasted when the internal memory is the base memory, as this portion of the external memory cannot be accessed in this mode. Of course, it is possible to purchase microcontrollers which can access a larger memory address space if more memory is required. However, such microcontrollers cost more, and offset the cost-savings benefit of using an inexpensive microcontroller.

What is needed, therefore, is a method of inexpensively and reliably allowing a microcontroller to select and access all of the internal memory and external memory available to it.

SUMMARY OF THE INVENTION

The above and other needs are met by a circuit for selecting a base memory to be accessed by a microcontroller in response to a command from the microcontroller. An input receives the command from the microcontroller. The command selectively instructs the circuit to reset the microcontroller and to signal the microcontroller to access an internal memory as the base memory. Also, the command selectively instructs the circuit to reset the microcontroller and to signal the microcontroller to access an external memory as the base memory. A reset output is used to send the reset signal to the microcontroller, and a memory select output is used to send a memory select signal to the microcontroller.

In the preferred embodiment, the command from the microcontroller selectively instructs the circuit to perform only one of the two different procedures described above at a time. The selection between the two procedures is made based on the content of the command, which content can be different from time to time. If the content of the command indicates that the internal memory is to be the base memory, then the circuit, in response to the command, is instructed to reset the microcontroller and signal the microcontroller to access the internal memory as the base memory. Similarly, if the content of the command indicates that the external memory is to be the base memory, then the circuit, in response to the command, is instructed to reset the microcontroller and signal the microcontroller to access the external memory as the base memory.

Logic circuitry processes the command received from the microcontroller, and selectively sends an internal base memory select signal on the memory select output in response to the command received from the microcontroller while the reset signal is being processed by the microcontroller, and selectively sends an external base memory select signal on the memory select output in response to the command received from the microcontroller while the reset signal is being processed by the microcontroller.

As described herein, the microprocessor sends instructions to the logic circuitry, and the logic circuitry sends signals to the microprocessor in reply. It will be appreciated that the instructions and the signals may comprise the same types and forms of communication. The two words, instructions and signals, are being used separately for the sake of clarity in explanation, so that the direction of communication between the microcontroller and the logic circuitry may be more readily understood. Thus, communication from the microcontroller to the logic circuitry will mostly be called instructions, and communication from the logic circuitry to the microcontroller will mostly be called signals.

Because the circuit is under the control of the microcontroller, the microcontroller is able to select when it will access the external memory as the base memory, and when it will access the internal memory as the base memory. Because the base memory select signal is sent to the microcontroller during a reset sequence initiated by the circuit, under the direction of the microcontroller, the level on the EA pin does not change after the microcontroller completes a reset and thus, the microcontroller is operated in a stable fashion, as recommended by manufacturers.

In preferred embodiments of the invention, the microcontroller is an 8-bit microcontroller, the external memory is a programmable flash memory, the external memory has a larger capacity than the internal memory, the external memory includes printer control code, the internal memory includes flash programming code, and the circuit sends the internal base memory select signal on the memory select output while the reset signal is being sent on the reset output in response to a power-on reset.

In a method for selecting a base memory to be accessed by a microcontroller, according to the present invention, a command is sent from the microcontroller to a circuit. The command selectively instructs the circuit to reset the microcontroller and to signal the microcontroller to access an internal memory as the base memory. The command also selectively instructs the circuit to reset the microcontroller and to signal the microcontroller to access an external memory as the base memory.

The command is received on an input of the circuit, and the command received from the microcontroller on the input of the circuit is processed with logic circuitry. The processing includes selectively generating an internal base memory select signal, and selectively generating an external base memory select signal.

A reset signal is sent to the microcontroller with the circuit on a reset output of the circuit, and the reset signal is received on a reset input of the microcontroller. The microcontroller enters a reset procedure in response to the reset signal received on the reset input. A memory select signal is selectively sent on a memory select output of the circuit, where the memory select signal is one of an internal memory select signal and an external memory select signal. The memory select signal is received on a memory select input of the microcontroller during the reset procedure.

When the memory select signal received from the circuit is the external base memory select signal, the microcontroller accesses the external memory as the base memory when the microcontroller exits the reset procedure. When the memory select signal received from the circuit is the internal base memory select signal, the microcontroller accesses the internal memory as the base memory when the microcontroller exits the reset procedure.

BRIEF DESCRIPTION OF THE DRAWINGS

Further advantages of the invention will become apparent by reference to the detailed description of preferred embodiments when considered in conjunction with the following drawings, which are not to scale so as to better show the detail, in which like reference numerals denote like elements throughout the several views, and wherein:

FIG. 1 is a functional block diagram depicting an ASIC with a microcontroller and an external memory;

FIG. 2 depicts a first embodiment of the signals received and sent by the ASIC; and FIG. 3 depicts a second embodiment of the signals received and sent by the ASIC.

DETAILED DESCRIPTION OF THE INVENTION

Referring now to the figures, there is depicted in FIG. 1 a microcontroller 10, such as a TMP90CM38 manufactured by Toshiba. The microcontroller 10 includes a CPU 12 and a ROM 14, also called an internal memory 14 herein. The CPU 12 and the internal memory 14 are electrically connected by bus 16. The microcontroller 10 is also electrically connected to an external memory 18 by bus 16.

As previously described, either the internal memory 14 or the external memory 18 may be accessed by the microcontroller 10 as the base memory. Again, when the internal memory 14 is accessible as the base memory, that portion of the external memory 18 which corresponds to the address space of the internal memory 14 is not accessible by the microcontroller 10. Further, when the external memory 18 is accessible as the base memory, none of the internal memory 14 is accessible by the microcontroller 10.

The base memory is selectable between the internal memory 14 and the external memory 18 by the level of the signal provided on the EA pin 22. For example, if the level on the EA 22 is low, the external memory 18 could be selected as the base memory, and if the level on the EA 22 is high, the internal memory 14 could be selected as the base memory. It will be appreciated that the association of the level on the EA 22 with the memory selected as the base memory may be different for different microcontrollers 10. In addition, the microcontroller 10 may have a series of inputs (not shown) by which the base memory is selectable between an internal memory 14 and one or more external memories 18. All such configurations and adaptations are compatible with and within the spirit of the present invention.

As described above, switching the level on the EA 22 after a reset procedure is completed renders the operation of the microcontroller 10 unstable, and is not a preferred mode of operation. It is preferable to switch the level on the EA 22 during a reset procedure, initiated by providing a signal on the RESET pin 26 of the microcontroller 10. The microcontroller 10 is unable to process such a sequence of steps on its own accord.

For example, if the microcontroller 10 where to initiate a reset procedure by sending a signal from one of its own outputs to the RESET 26, it would not be able to switch the level on the EA 22 during the reset procedure, even if it had an output tied to the EA 22. The reason for this is that during a reset procedure, the microcontroller 10 does not have the ability to process signals other than those specifically defined by the reset procedure.

Thus, according to one embodiment of the present invention, a circuit 30, such as an application specific integrated circuit (ASIC) is electrically connected to the microcontroller 10. The circuit 30 contains logic circuitry which, under the direction of the microcontroller 10, can complete the desired steps of the base memory selection process which the microcontroller 10 is unable to complete by itself.

The circuit 30 has a memory select output 32 which is electrically connected to the EA 22 of the microcontroller 10 by line 24. An input 48 is electrically connected to an output 42 of the microcontroller 10 by bus 16, and a reset output 34 is electrically connected to the RESET 26 of the microcontroller 10 by line 28.

When the microcontroller 10 desires, for example, to switch its base memory from the internal memory 14 to the external memory 18, it sends a command from the output 42 on bus 16, which is received by the input 48 of the circuit 30. FIG. 2 represents the timing or some of the signals received and sent by the circuit 30. Trace 36 represents the transmission of a byte 20 on bus 16, which is the command signal sent from the microcontroller 10 to the circuit 30.

In an alternate embodiment, the command might be sent using two signal lines instead of bus 16. In this embodiment, one signal line indicates which base memory is to be selected, and the other signal line is toggled to cause circuit 30 to initiate the reset of the microcontroller 10. In a further embodiment, just one signal line is used instead of bus 16. An initial level transition, on this single signal line, from the inactive state to the active state would arm circuit 30 for the reset operation, and then the signal line would return to its initial inactive state. The choice of which base memory to select, either internal memory 14 or external memory 18, is communicated to the circuit 30 by the amount of time the microcontroller 10 holds the signal on the line in the active state. For example, a relatively long active signal could indicate that the internal memory 14 should be the base memory, and a relatively short active signal could indicate that the external memory 18 should be the base memory.

When the command from the microcontroller 10 is received by the circuit 30 on bus 16, it is processed by logic circuitry within the circuit 30. The logic circuitry prompts the circuit 30 to send a reset signal on the reset output 34 to the RESET 26 of the microcontroller 10 on line 28. This is graphically depicted in FIG. 2, where trace 38 is brought low for a predetermined number of clock pulses. When the microcontroller 10 receives the signal at the RESET 26, it enters the reset procedure.

While the microcontroller 10 is in the reset procedure, the circuit 30 sends a signal on the memory select output 32 to the EA 22 on line 24. This is depicted in FIG. 2 as the trace 40 dropping to a low level, which in this example represents an external base memory select signal. When the microcontroller 10 exits the reset procedure, indicated by the level of trace 38 coming high once again, the microcontroller 10 is in a mode where the external memory 18 is selected as the base memory. In the preferred embodiment, the signal applied to the RESET 26 only resets the microcontroller 10, and nothing else in the system. Thus, when the microcontroller 10 comes out of the reset procedure, it may interrogate the other components in the system to determine the state in which the system was left before the reset.

FIG. 3 depicts the timing signals in the case where the microcontroller 10 is already accessing the external memory 18 as the base memory. Thus, in this example, the circuit 30 generates an internal base memory select signal by bringing the level on line 24 high during the reset procedure, as depicted by trace 40 switching from a low state to a high state.

In the preferred embodiment, two different commands may be sent from microcontroller 10 to circuit 30 via bus 16. One command instructs circuit 30 to initiate the reset and to select external memory 18 as the base memory. The other command instructs circuit 30 to initiate the reset and to select internal memory 14 as the base memory. Thus, in the preferred embodiment, the microcontroller 10 can select either the internal memory 14 or the external memory 18 as the base memory, regardless of which of the two was acting as the base memory prior to the reset. Therefore, the preferred embodiment is not restricted to merely toggling between the internal memory 14 and the external memory 18 as the base memory.

In an alternate embodiment, a single command instructs the circuit 30 to select the external memory 18 as the base memory if the base memory is currently the internal memory 14. Similarly, the command instructs the circuit 30 to select the internal memory 14 as the base memory if the base memory is currently the external memory 18. This alternate single-command embodiment tends to restrict the operation of the circuit 30, such that it can only toggle between the selection of the internal memory 14 and the external memory 18 as the base memory.

The present invention has wide application, such as in a printer. In this application, the external memory 18 would preferably be a flash memory, and would have a larger capacity than the internal memory 14. The internal memory 14 could contain the flash programming code, which would enable the flash external memory 18 to be programmed. Thus, during manufacture, a blank, or unpopulated, flash external memory 18 could be placed in the printer assembly, and the internal memory 14 of the microcontroller 10 would already contain the necessary instructions to program the external memory 18. In conjunction with this, upon a power-on reset (POR) the circuit 30 would issue an internal base memory selection signal to the microcontroller 10, so that the flash programming routines in the internal memory 14 would be available, and the microcontroller 10 would be in a mode where the external memory 18 could be reprogrammed.

Because printer control code typically requires more memory space than do flash programming routines, the printer control code is preferably placed in the external memory 18. This utilization of the internal memory 14 and external memory 18 is especially preferred, as the smaller flash programming code which resides in the internal memory 14 typically requires less updating than the printer control code which resides in the flash external memory 18, which can be easily updated. Further, it would not be convenient to break the printer control code across both the internal memory 14 and external memory 18 in such a way that the microcontroller 10 would need to be reset in order to access all of the code, because this would disrupt the printing routines, resulting in, at the very least, a degradation of printing efficiency. However, resetting prior to reprogramming the flash external memory 18 using the flash programming routines in the internal memory 14 would typically not be a problem, and would be a convenient default mode for the system to be in upon a power-on reset.

While specific embodiments of the invention have been described with particularity above, it will be appreciated that the invention is equally applicable to different adaptations well known to those skilled in the art.

We claim:

1. A circuit for selecting a base memory to be accessed by a microcontroller in response to a command from the microcontroller, comprising:

a. an input for receiving the command from the microcontroller, the command selectively instructing the circuit to reset the microcontroller and to signal the microcontroller to access an internal memory as the base memory, and selectively instructing the circuit to reset the microcontroller and to signal the microcontroller to access an external memory as the base memory, b. a reset output for sending a reset signal to the microcontroller, c. a memory select output for sending a memory select signal to the microcontroller, and d. logic circuitry for;
 i. processing the command received from the microcontroller,
 ii. selectively sending an internal base memory select signal on the memory select output in response to the command received from the microcontroller while the reset signal is being processed by the microcontroller, and
 iii. selectively sending an external base memory select signal on the memory select output in response to the command received from the microcontroller while the reset signal is being processed by the microcontroller.

2. The circuit of claim 1 wherein the microcontroller further comprises an 8-bit microcontroller.

3. The circuit of claim 1 wherein the external memory further comprises a flash programmable memory.

4. The circuit of claim 1 wherein the external memory has a larger capacity than the internal memory.

5. The circuit of claim 1 wherein the circuit sends the internal base memory select signal on the memory select output while the reset signal is being sent on the reset output in response to a power-on reset.

6. The circuit of claim 1 wherein the external memory further comprises printer control code.

7. The circuit of claim 1 wherein the internal memory further comprises flash programming code.

8. A printer controller of the type having a microcontroller and an external memory, the improvement comprising a circuit for selecting a base memory to be accessed by the microcontroller in response to a command from the microcontroller, comprising:

a. an input for receiving the command from the microcontroller, the command selectively instructing the circuit to reset the microcontroller and to signal the microcontroller to access an internal memory as the base memory, and selectively instructing the circuit to reset the microcontroller and to signal the microcontroller to access the external memory as the base memory, b. a reset output for sending a reset signal to the microcontroller, c. a memory select output for sending a memory select signal to the microcontroller, and d. logic circuitry for;
 i. processing the command received from the microcontroller,
 ii. selectively sending an internal base memory select signal on the memory select output in response to the command received from the microcontroller while the reset signal is being processed by the microcontroller, and
 iii. selectively sending an external base memory select signal on the memory select output in response to the command received from the microcontroller while the reset signal is being processed by the microcontroller.

9. The circuit of claim 8 wherein the microcontroller further comprises an 8-bit microcontroller.

10. The circuit of claim 8 wherein the external memory further comprises a flash programmable memory.

11. The circuit of claim 8 wherein the external memory has a larger capacity than the internal memory.

12. The circuit of claim 8 wherein the circuit sends the internal base memory select signal on the memory select output while the reset signal is being sent on the reset output in response to a power-on reset.

13. The circuit of claim 8 wherein the external memory further comprises printer control code.

14. The circuit of claim 8 wherein the internal memory further comprises flash programming code.

15. A method for selecting a base memory to be accessed by a microcontroller, comprising:

a. sending a command from the microcontroller to a circuit, the command selectively instructing the circuit to reset the microcontroller and to signal the microcontroller to access an internal memory as the base memory, and selectively instructing the circuit to reset the microcontroller and to signal the microcontroller to access an external memory as the base memory, b. receiving the command on an input of the circuit, c. processing the command received from the microcontroller on the input of the circuit with logic circuitry, the processing including;
 i. selectively generating an internal base memory select signal, and
 ii. selectively generating an external base memory select signal;

d. sending a reset signal to the microcontroller with the circuit on a reset output of the circuit, e. receiving the reset signal on a reset input of the microcontroller, f. the microcontroller entering a reset procedure in response to the reset signal received on the reset input, g. selectively sending a memory select signal on a memory select output of the circuit, the memory select signal being one of an internal memory select signal and an external memory select signal, h. receiving the memory select signal on a memory select input of the microcontroller, the microcontroller receiving the memory select signal on the memory select input during the reset procedure, i. accessing the external memory as the base memory with the microcontroller upon the microcontroller exiting the reset procedure when the memory select signal receiving from the circuit is the external base memory select signal, and j. accessing the internal memory as the base memory with the microcontroller upon the microcontroller exiting the reset procedure when the memory select signal received from the circuit is the internal base memory select signal.

16. The method of claim 15 wherein the microcontroller further comprises an 8-bit microcontroller.

17. The method of claim 15 wherein the external memory further comprises a flash programmable memory.

18. The method of claim 15 wherein the circuit sends the internal base memory select signal on the memory select output in response to a power-on reset.

19. The method of claim 15 wherein the external memory further comprises printer control code.

20. The method of claim 15 wherein the internal memory further comprises flash programming code.

21. An apparatus for selecting and accessing one of an internal memory and an external memory as a base memory, comprising:

a. a microcontroller having an output for sending a base memory select command, a reset input for receiving a reset signal, and a base memory select input for receiving a base memory select signal, and b. a circuit having an input for receiving the base memory select command from the microcontroller, a reset output for sending the reset signal to the reset input of the microcontroller, and a base memory select output for sending the base memory select signal to the microcontroller, the circuit also having logic circuitry for;
  i. processing the base memory select command received from the microcontroller,
  ii. sending the reset signal to the microcontroller in response to the base memory select command, and
  iii. in response to the base memory select command received from the microcontroller, and while the reset signal is being processed by the microcontroller, selectively sending on the base memory select output one of;
    (1) an internal base memory select signal, thereby signaling the microcontroller to select and access the internal memory as the base memory, and
    (2) an external base memory select signal, thereby signaling the microcontroller to select and access the external memory as the base memory.

* * * * *